United States Patent
Okumura et al.

(10) Patent No.: US 11,433,786 B2
(45) Date of Patent: Sep. 6, 2022

(54) CABLE WINDING DEVICE AND FLAT CABLE ROUTING STRUCTURE FOR SLIDING SEAT

(71) Applicants: FURUKAWA ELECTRIC CO., LTD., Tokyo (JP); FURUKAWA AUTOMOTIVE SYSTEMS INC., Inukami-gun (JP)

(72) Inventors: Masahiro Okumura, Inukami-gun (JP); Naoshi Saoya, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 17/027,793

(22) Filed: Sep. 22, 2020

(65) Prior Publication Data
US 2021/0001753 A1 Jan. 7, 2021

Related U.S. Application Data (63) Continuation of application No. PCT/JP2019/012157, filed on Mar. 22, 2019.

(30) Foreign Application Priority Data
Mar. 26, 2018 (JP) .............................. JP2018-059012

(51) Int. Cl.
*B60N 2/07* (2006.01)
*B60R 16/02* (2006.01)
(Continued)

(52) U.S. Cl.
CPC ............. *B60N 2/0722* (2013.01); *B60N 2/06* (2013.01); *B60N 2/0705* (2013.01); *B60R 16/0215* (2013.01); *H02G 11/02* (2013.01)

(58) Field of Classification Search
CPC ...... B60N 2/0705; B60N 2/075; B60N 2/062; B60N 2/0652; B60N 2/06; B60N 2/07; B60N 2/0735; B60N 2/0722; H02G 11/02
See application file for complete search history.

(56) References Cited

U.S. PATENT DOCUMENTS 3,612,743 A * 10/1971 Angele ................ H01B 7/0838
174/36
4,749,370 A * 6/1988 Moser .................. H01R 13/582
439/460
(Continued)

FOREIGN PATENT DOCUMENTS

| EP | 2 476 589 A1 | 7/2012 |
| JP | 10-341521 A | 12/1998 |

(Continued)

OTHER PUBLICATIONS

International Search Report dated May 14, 2019 in PCT/JP2019/012157 filed Mar. 22, 2019 (with English Translation), 5 pages.
(Continued)

*Primary Examiner* — Nkeisha Smith
(74) *Attorney, Agent, or Firm* — Oblon, McClelland, Maier & Neustadt, L.L.P.

(57) ABSTRACT

A cable winding device is provided, which is for a flexible flat cable routed to a sliding seat slidably supported allowing for forward and backward movement in a longitudinal direction of a fixed rail; a first side end portion of the cable being fixed to an end of the fixed rail corresponding to a first rail end portion; the device including a winding housing portion inside which a second side end portion of the cable is fixed; the winding portion being fixed to a movable body supporting the seat and configured to slide in a forward and backward direction relative to the fixed rail; in a case where the winding portion moves in a forward (or backward) movement direction toward (or away from) the first rail end
(Continued)

portion, the cable is wound in the winding portion (or is fed out along the fixed rail from the winding portion).

17 Claims, 6 Drawing Sheets

(51) Int. Cl.
    *H02G 11/02*     (2006.01)
    *B60N 2/06*     (2006.01)

(56) References Cited

U.S. PATENT DOCUMENTS

| | | | | |
|---|---|---|---|---|
| 6,267,430 | B1* | 7/2001 | Cresseaux | B60N 2/0224 296/65.13 |
| 6,328,243 | B1* | 12/2001 | Yamamoto | B65H 75/4449 191/12.2 R |
| 6,494,523 | B2* | 12/2002 | Kobayashi | B60R 16/0207 174/113 R |
| 6,682,353 | B2* | 1/2004 | Bigotto | H02G 11/006 439/34 |
| 6,997,499 | B2* | 2/2006 | Tsubaki | B60N 2/0224 174/72 A |
| 7,252,541 | B2* | 8/2007 | Tsubaki | H02G 11/00 439/501 |
| 7,341,478 | B2* | 3/2008 | Tsubaki | H02G 11/00 439/501 |
| 7,829,789 | B2* | 11/2010 | Yamaguchi | H02G 3/0468 174/72 A |
| 8,342,855 | B2* | 1/2013 | Tsirangelos | B64D 11/0624 439/32 |
| 9,401,591 | B2* | 7/2016 | Satou | B60R 16/027 |
| 9,550,460 | B2* | 1/2017 | Tsubaki | B60R 16/0215 |
| 9,701,261 | B2* | 7/2017 | Katsuramaki | B60R 16/027 |
| 10,377,341 | B2* | 8/2019 | Katsuramaki | B60R 16/027 |
| 10,589,640 | B2* | 3/2020 | Nakamura | B60N 2/0725 |
| 10,730,455 | B1* | 8/2020 | Ofuchi | B60R 16/0215 |
| 10,773,663 | B2* | 9/2020 | Sano | H02G 3/0437 |
| 2004/0159764 | A1* | 8/2004 | Oshima | B60N 2/067 248/429 |
| 2005/0035622 | A1 | 2/2005 | Tsubaki et al. | |
| 2005/0264033 | A1* | 12/2005 | Aoki | E05D 11/0081 296/155 |
| 2006/0199416 | A1* | 9/2006 | Tsubaki | B60R 16/027 439/352 |
| 2007/0087618 | A1* | 4/2007 | Terada | B60N 2/0732 439/397 |
| 2007/0107926 | A1* | 5/2007 | Nishijima | H02G 11/006 174/72 A |
| 2009/0035953 | A1* | 2/2009 | Tsubaki | H02G 11/006 439/34 |
| 2012/0162959 | A1 | 6/2012 | Terada et al. | |
| 2014/0042289 | A1* | 2/2014 | Kawano | B60N 2/0875 248/429 |
| 2014/0339376 | A1* | 11/2014 | Katou | B60R 16/027 248/49 |
| 2014/0353415 | A1* | 12/2014 | Katsuramaki | H02G 11/02 242/371 |
| 2016/0013627 | A1* | 1/2016 | Katsuramaki | H02G 11/02 242/377 |
| 2017/0062186 | A1 | 3/2017 | Coumou et al. | |
| 2017/0294767 | A1* | 10/2017 | Sano | H02G 11/02 |

FOREIGN PATENT DOCUMENTS

| | | |
|---|---|---|
| JP | 2004-161438 A | 6/2004 |
| JP | 2004-322884 A | 11/2004 |
| JP | 2005-59745 A | 3/2005 |
| JP | 2007-110819 A | 4/2007 |
| JP | 2010-172116 A | 8/2010 |
| JP | 2011-57132 A | 3/2011 |
| JP | 2013-153556 A | 8/2013 |
| WO | WO 2010/103904 A1 | 9/2010 |

OTHER PUBLICATIONS

Japanese Office Action dated Sep. 27, 2019 in Japanese Application 2019-529664 (with English Translation), 8 pages.
Office Action dated Dec. 2, 2021 in corresponding Korean Patent Application No. 10-2020-7027056 (with English Translation), 4 pages.
Extended European Search Report dated Apr. 19, 2021 in corresponding European Patent Application No. 19776348.5, 9 pages.
Korean Office Action issued in Korean Patent Application No. 9-5-2002-04616648 dated Jun. 23, 2022, (w/ English Translation).

\* cited by examiner

CABLE WINDING DEVICE AND FLAT CABLE ROUTING STRUCTURE FOR SLIDING SEAT

CROSS-REFERENCE TO RELATED APPLICATION

The present application is a continuation application of International Application No. PCT/JP2019/012157, filed Mar. 11, 2019, which claims priority to Japanese Patent Application No. 2018-059012 filed Mar. 26, 2018. The contents of these applications are incorporated herein by reference in their entirety.

The disclosure relates to, for example, a cable winding device for a flexible flat cable and a flat cable routing structure for a sliding seat, the flexible flat cable being routed to and supplying power to a sliding seat slidably supported allowing for forward and backward movement in a longitudinal direction of a fixed rail fixed to a vehicle body.

TECHNICAL FIELD

Background Art

In the related art, various power supply devices are known that supply power to a sliding seat slidably supported, allowing for forward and backward movement in the longitudinal direction, by a fixed rail fixed to a vehicle body. One such example is the power supply device for a sliding seat described in Patent Document 1. This power supply device has a configuration in which a wire harness with one end connected to a sliding seat side is housed in a harness housing portion, and a U-turn portion of the wire harness housed in a U-turn-like shape in the harness housing portion moves in association with the sliding seat sliding, thus allowing the wire harness to follow the sliding seat sliding.

However, because the U-turn portion of the wire harness housed in this U-turn-like shape moves in association with the sliding seat sliding, the U-turn portion requires space to move in association with the sliding seat sliding. This prevents the power supply device of a sliding seat from being made compact.

CITATION LIST

Patent Documents

Patent Document 1: JP 2005-59745A

SUMMARY

Technical Problem

In light of the problems described above, an object of the disclosure is to provide a cable winding device and a flat cable routing structure for a sliding seat with a compact structure capable of supplying power to a sliding seat.

Solution to Problem

The disclosure is a cable winding device for a flexible flat cable routed to a sliding seat slidably supported allowing for forward and backward movement in a longitudinal direction of a fixed rail fixed to a vehicle body, wherein
a first side end portion of the flexible flat cable corresponding to a first cable end portion is fixed to an end of the fixed rail corresponding to a first rail end portion, the cable winding device including:
a winding housing portion inside which a second side end portion of the flexible flat cable corresponding to a second cable end portion is fixed and inside which the flexible flat cable is wound and housed in a manner being able to be fed out, wherein
the winding housing portion is fixed to a movable body supporting the sliding seat and configured to slide in a forward and backward direction relative to the fixed rail;
in a case in which the winding housing portion moves in a forward movement direction toward the first rail end portion, the flexible flat cable routed along the fixed rail is wound in the winding housing portion; and
in a case in which the winding housing portion moves in a backward movement direction away from the first rail end portion, the flexible flat cable is fed out along the fixed rail from the winding housing portion.

Also, the disclosure is a flat cable routing structure for a sliding seat, including:
the cable winding device described above;
the fixed rail fixed to the vehicle body;
the movable body configured to slidably support the sliding seat allowing for forward and backward movement along the longitudinal direction of the fixed rail, the cable winding device being fixed to the movable body; and
the flexible flat cable including the first cable end portion fixed to the first rail end portion and the second cable end portion fixed to the cable winding device and configured to be wound in the cable winding device in a manner being able to be fed out, wherein
the flexible flat cable is routed to the sliding seat slidably supported allowing for forward and backward movement along the longitudinal direction of the fixed rail.

The flexible flat cable may be one flexible flat cable, or may be a plurality of flexible flat cables layered together. Furthermore, the flexible flat cable may be layered together with a flexible flat cable without a conductor, i.e., a dummy cable, or may be layered together with a strip-shaped member different from the flexible flat cable.

Typically, the above-described longitudinal direction of the fixed rail fixed to the vehicle body described above is the vehicle body forward and backward direction. Thus, the forward and backward direction corresponds to the vehicle body forward and backward direction. Accordingly, in a case in which the first rail end portion corresponding to one end of the fixed rail is the end portion on the vehicle body front side, the forward movement direction corresponds to the vehicle body front direction, and the backward movement direction corresponds to the vehicle body back direction. Conversely, in a case in which the first rail end portion corresponding to one end of the fixed rail is the end portion on the vehicle body back side, the forward movement direction corresponds to the vehicle body back direction, and the backward movement direction corresponds to the vehicle body front direction.

Note that "being fixed to the first rail end portion corresponding to one end of the fixed rail" includes not only the case of being directly fixed to the end of the fixed rail, but also the case of, for example, when the flexible flat cable does not move in the longitudinal direction relative to the end portion of the fixed rail, being fixed inside a module housing outside of the fixed rail, and thus indirectly fixed to the end portion of the fixed rail.

According to the disclosure, power can be supplied to the sliding seat via the flexible flat cable using a compact structure.

Specifically, a first side end portion of the flexible flat cable corresponding to a first cable end portion is fixed to an end of the fixed rail corresponding to a first rail end portion; a winding housing portion inside which a second side end portion of the flexible flat cable corresponding to a second cable end portion is fixed and inside which the flexible flat cable is wound and housed in a manner being able to be fed out is provided; the winding housing portion is fixed to a movable body supporting the sliding seat and configured to slide in a forward and backward direction relative to the fixed rail; and in a case in which the winding housing portion moves in a forward movement direction toward the first rail end portion, the flexible flat cable routed along the fixed rail is wound in the winding housing portion. Thus, a large space such as a harness housing portion that movably houses a U-turn portion, for example, is not needed, and a compact structure can be achieved.

In addition, when the cable winding device moves in the backward movement direction away from the first rail end portion, the flexible flat cable is fed out along the fixed rail from the winding housing portion. Thus, compared to a configuration in which a U-turn portion moves when the sliding seat slides, the flexible flat cable does not slide with the fixed rail and the like. This can enhance the durability of the flexible flat cable.

In an aspect of the disclosure, the winding housing portion may be disposed in the forward movement direction of the movable body.

According to this disclosure, when the flexible flat cable is wound in the winding housing portion or fed out from the winding housing portion, the flexible flat cable can smoothly follow the sliding of the sliding seat without a large bending load acting on the flexible flat cable as is what happens in the case in which the winding housing portion is disposed in the backward movement direction of the movable body.

In another aspect of the disclosure, a cable entrance through which the flexible flat cable passes in and out of the winding housing portion may be provided closer to the fixed rail than the winding housing portion.

According to this disclosure, when the flexible flat cable is wound in the winding housing portion or fed out from the winding housing portion, the flexible flat cable can smoothly follow the sliding of the sliding seat without a bending load acting on the flexible flat cable as is what happens in the case in which the winding housing portion is disposed on the fixed rail side of the cable entrance. Also, the cable entrance can be prevented from being visible to the occupant.

In another aspect of the disclosure, a communicating portion connecting the winding housing portion and the cable entrance may be provided, the communicating portion being inclined in the forward movement direction toward the fixed rail.

According to this disclosure, the flexible flat cable can be smoothly wound and fed out.

Specifically, the communicating portion connecting the winding housing portion and the cable entrance is inclined in the forward movement direction toward the fixed rail. Thus, the communicating portion is disposed in the forward movement direction of the guide portion relative to the section of the winding housing portion where the flexible flat cable is wound and fed out. This makes the route of the flexible flat cable passing through the cable entrance, the communicating portion, and the winding housing portion smooth, and can reduce the load acting on the flexible flat cable when the flexible flat cable is wound or fed out.

In another aspect of the disclosure, a winding shaft around which the flexible flat cable is wound may be provided inside the winding housing portion; and the cable entrance may be disposed in the backward movement direction of the winding shaft.

According to this disclosure, the route of the flexible flat cable, which is housed and wound in the winding housing portion after passing through the cable entrance, inside the winding housing portion can be made simple and not complex. Also, the load acting on the flexible flat cable when the flexible flat cable wound around the winding shaft is wound or fed out can be reduced.

In addition, in the case in which the cable entrance is disposed in the forward movement direction of the winding shaft, the cable entrance is located at a position away from the movable body. In this case, the position of the cable entrance relative to the movable body may change due to vibrations when the movable body moves along the fixed rail. In contrast, because the cable entrance disposed in the backward movement direction of the winding shaft is disposed close to the movable body, it is unlikely that the position will change when the movable body moves, and the flexible flat cable can be wound and fed out smoothly.

In another aspect of the disclosure, the winding shaft may be disposed inside the winding housing portion on a side closer to the cable entrance in the forward and backward direction and may be disposed eccentric closer to a side away from the cable entrance in a vertical direction.

According to this disclosure, the load acting on the flexible flat cable inside the winding housing portion can be reduced.

Specifically, by the winding shaft being disposed eccentric on the side closer to the cable entrance in the forward and backward direction and eccentric on the side away from the cable entrance in the vertical direction, space is formed inside the winding housing portion on the side away from the cable entrance in the forward and backward direction and the side closer to the cable entrance in the vertical direction, and the flexible flat cable wound around the winding shaft can spread out into this space when being fed out and unwound. This can reduce the load acting on the flexible flat cable inside the winding housing portion.

In another aspect of the disclosure, the cable entrance may be disposed above the fixed rail including a rail bottom surface portion and a rail side wall erected on each side of the rail bottom surface portion in a width direction such that a groove-like cross-section is formed with the rail bottom surface portion and the rail side wall, and a guide portion extending from the cable entrance to a groove inner portion of the fixed rail may be provided.

According to this disclosure, the flexible flat cable can be wound and fed out smoothly, via the guide portion, with respect to the groove inner portion of the fixed rail with a groove-like cross-section.

In addition, because the cable entrance is disposed above the fixed rail, a wide cable entrance relative to the width of the flexible flat cable can be formed. This can prevent the flexible flat cable that passes through the cable entrance from sliding on the cable entrance.

In another aspect of the disclosure, the guide portion may be disposed on an opposite side, with respect to the flexible flat cable, to the rail bottom surface portion, and may include an upper restricting portion configured to restrict on an upper side the flexible flat cable installed in the groove inner portion of the fixed rail and an arc-shaped guide portion with an arc shape configured to guide the flexible flat cable toward the cable entrance.

According to this disclosure, the flexible flat cable is guided toward the cable entrance via the arc-shaped guide portion. Thus, the flexible flat cable can be wound and fed out smoothly with respect to the groove inner portion of the fixed rail with a groove-like cross-section.

In addition, the position, in the groove inner portion of the fixed rail, of the flexible flat cable that is wound and fed out is restricted from moving upward by the upper restricting portion, preventing any obstruction to smooth winding and feeding out.

In another aspect of the disclosure, on an end portion of the upper restricting portion in the forward movement direction, a front bent back portion that is smoothly bent back upward may be provided.

According to this disclosure, the flexible flat cable can be smoothly wound and fed out without catching on the end portion of the upper restricting portion in the forward movement direction.

In another aspect of the disclosure, on an upper portion of the guide portion at least above the upper restricting portion, a tapered portion that tapers with an incline toward the forward movement direction may be provided.

According to this disclosure, the guide portion extending to the groove inner portion of the fixed rail with a groove-like cross-section can move smoothly without any obstruction to the movement in the forward movement direction of the movable body. In particular, even in the case in which the rail mold is provided that prevents foreign material from entering the upper portion of the fixed rail with a groove-like cross-section, the tapered portion, that tapers with an incline toward the forward movement direction, can push through the rail mold when the movable body moves in the forward movement direction, allowing for smooth movement.

In another aspect of the disclosure, the fixed rail may include a rail bottom surface portion and a rail side wall erected on each side of the rail bottom surface portion in a width direction such that a groove-like cross-section is formed with the rail bottom surface portion and the rail side wall, and on the rail bottom surface portion, a bottom surface protrusion portion protruding upward may be provided at predetermined intervals in the longitudinal direction.

According to this disclosure, in the groove inner portion of the fixed rail, the flexible flat cable is disposed above the bottom surface protrusion portions disposed at predetermined intervals in the longitudinal direction. Thus, the number of contacting locations with the flexible flat cable routed in the groove inner portion can be reduced, and this can prevent the flexible flat cable from rubbing on the rail bottom surface portion.

In another aspect of the disclosure, in a groove inner portion of the fixed rail, a thin strip member with a hardness greater than a hardness of the flexible flat cable may be installed along the longitudinal direction above the flexible flat cable.

Examples of the thin strip member with a hardness greater than a hardness of the flexible flat cable include a rust-resistant metal thin strip member such as a stainless steel spring steel or a resin thin strip member with a predetermined elasticity. Furthermore, from the perspective of durability and springiness, a metal thin strip member is more preferable.

According to this disclosure, the flexible flat cable routed in the groove inner portion is installed along the longitudinal direction above the flexible flat cable. In this way, the flexible flat cable can be protected by the thin strip member with a greater hardness than the flexible flat cable.

In another aspect of the disclosure, the flexible flat cable may be wound in the winding housing portion together with the thin strip member.

According to this disclosure, the flexible flat cable and the thin strip member are layered together, wound and fed out, and can be routed along the fixed rail.

In another aspect of the disclosure, the first cable end portion of the flexible flat cable may include a step structure or a bent back structure and may be fixed to the first rail end portion.

According to this disclosure, in the case in which another flexible flat cable or the thin strip member are layered together and wound in the winding housing portion, slack may be created due to the flexible flat cable or the other layered flexible flat cable and the thin strip member having different winding diameters and thus a different circumferential length. However, this difference in circumferential length can be absorbed at the first cable end portion formed with the step structure or the bent back structure.

In another aspect of the disclosure, a connector electrically connected to the flexible flat cable housed inside the cable winding device may be provided to the cable winding device.

According to this disclosure, an electronic device provided in the sliding seat that slides can be easily and reliably electrically connected via the connector.

In another aspect of the disclosure, the connector may be fixed to an external portion external to a housing of the cable winding device.

According to this disclosure, because the connector can be stabilized, an electronic device provided in the sliding seat that slides can be more reliably electrically connected via the connector.

In another aspect of the disclosure, two of the fixed rails may be disposed with a predetermined interval between the fixed rails in a vehicle width direction; the cable winding device may be mounted on the movable body mounted on one of the two fixed rails, and in the housing of the cable winding device, the connector may be fixed on a side of the housing closer to where the other of the fixed rails is disposed.

According to this disclosure, because the connector can be made not visible to the occupant, an electronic device provided in the sliding seat that slides can be easily and reliably electrically connected via the connector while maintaining a good appearance.

Advantageous Effects of Invention

According to the disclosure, a cable winding device and a flat cable routing structure for a sliding seat with a compact structure capable of supplying power to a sliding seat can be provided.

DESCRIPTION OF EMBODIMENTS

Embodiments of the disclosure will be described in detail with reference to the drawings.

Figure 1:
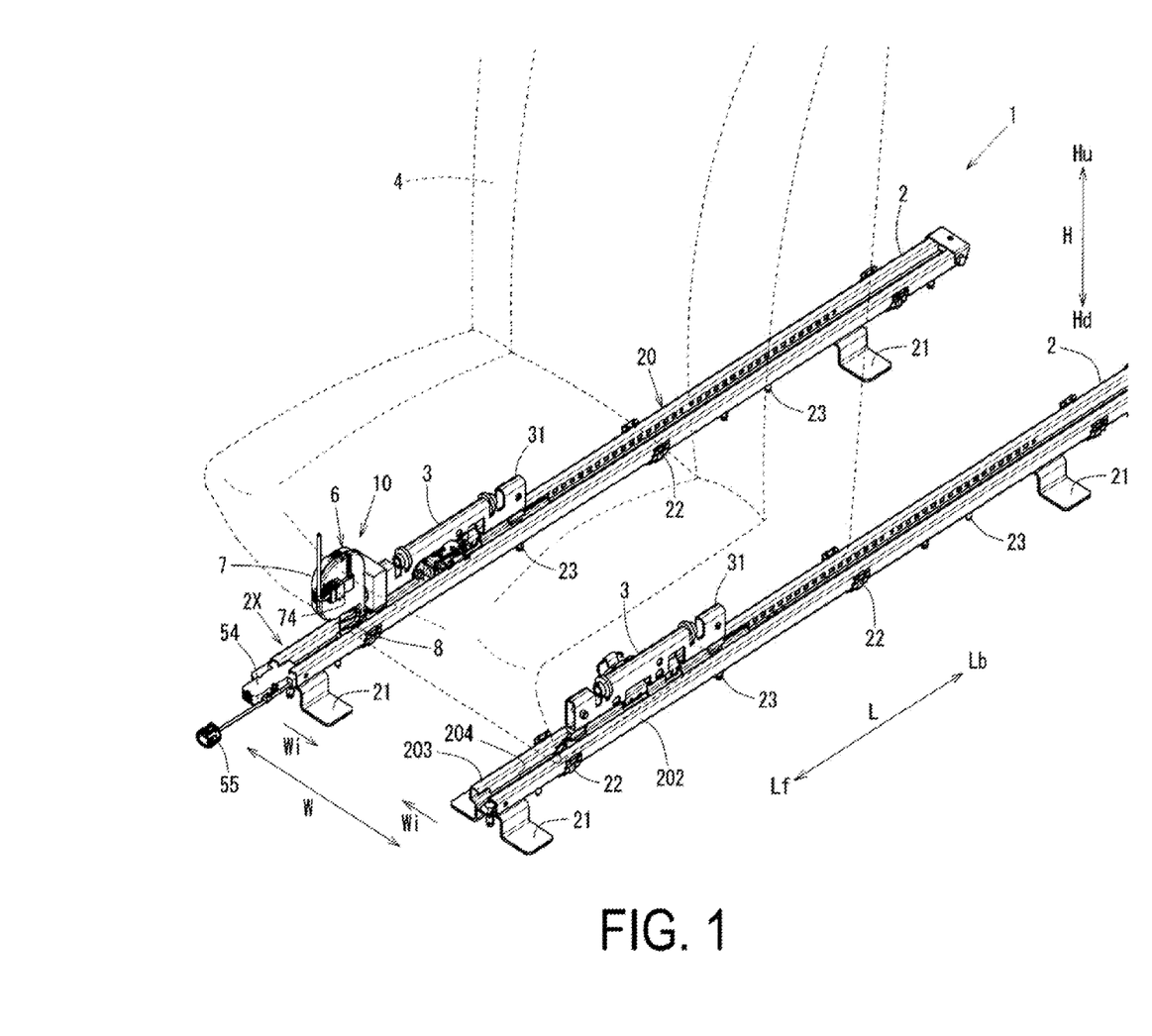
FIG. 1 is a schematic perspective view of a seat sliding structure.
Figure 2:
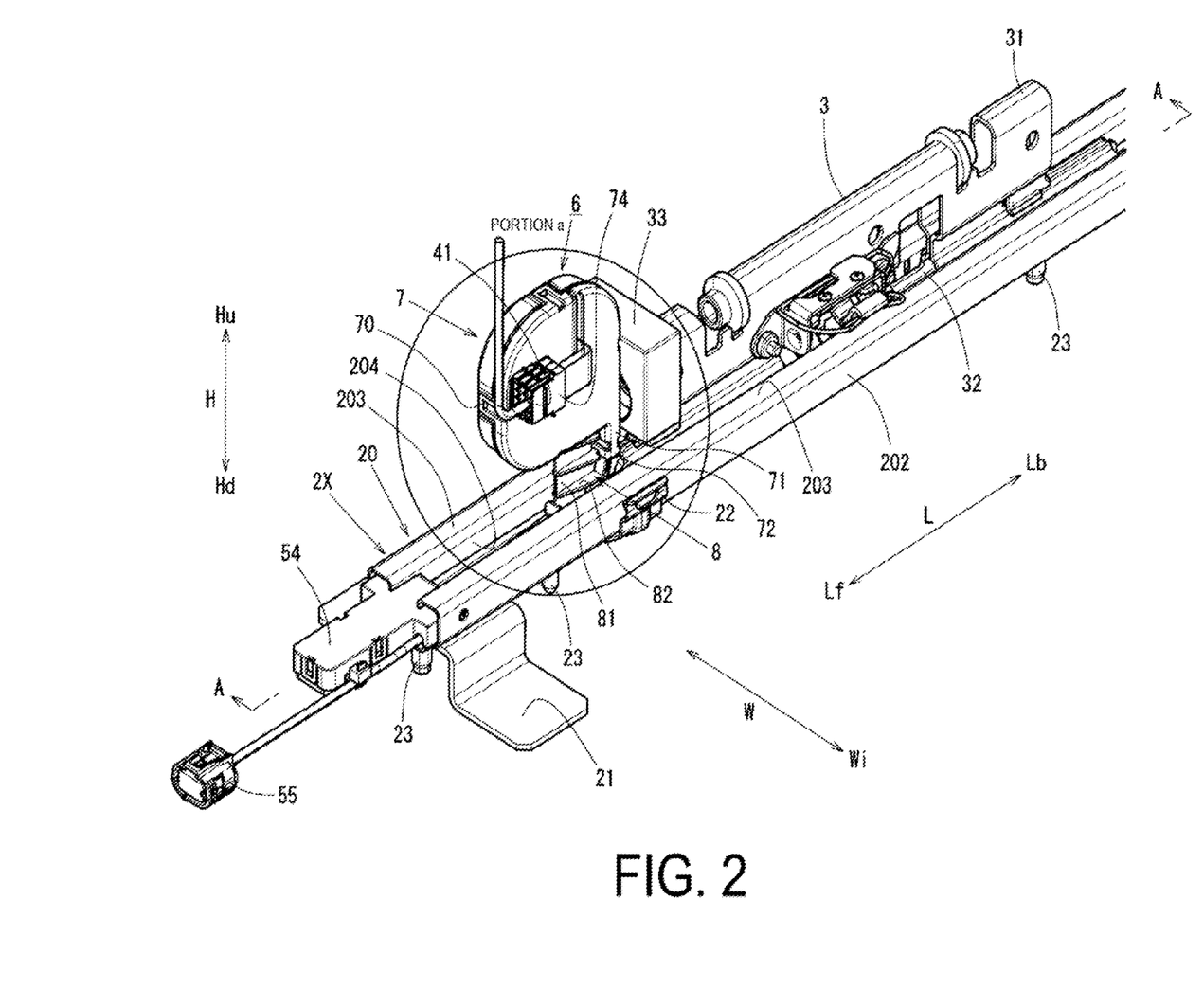
FIG. 2 is a schematic perspective view of a flat cable routing structure.
Figure 3:
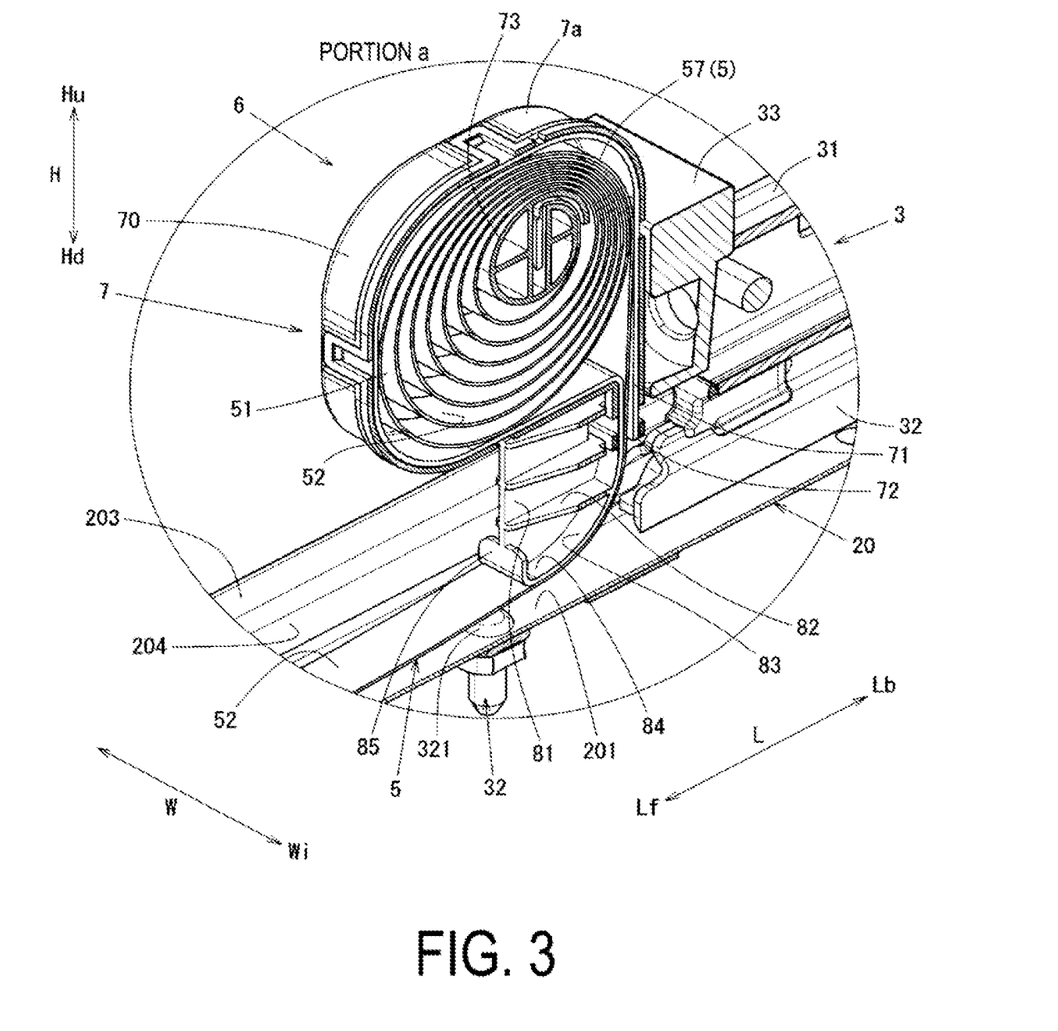
FIG. 3 is an enlarged cross-sectional perspective view along line A-A of portion a of FIG. 2.
Figure 4:
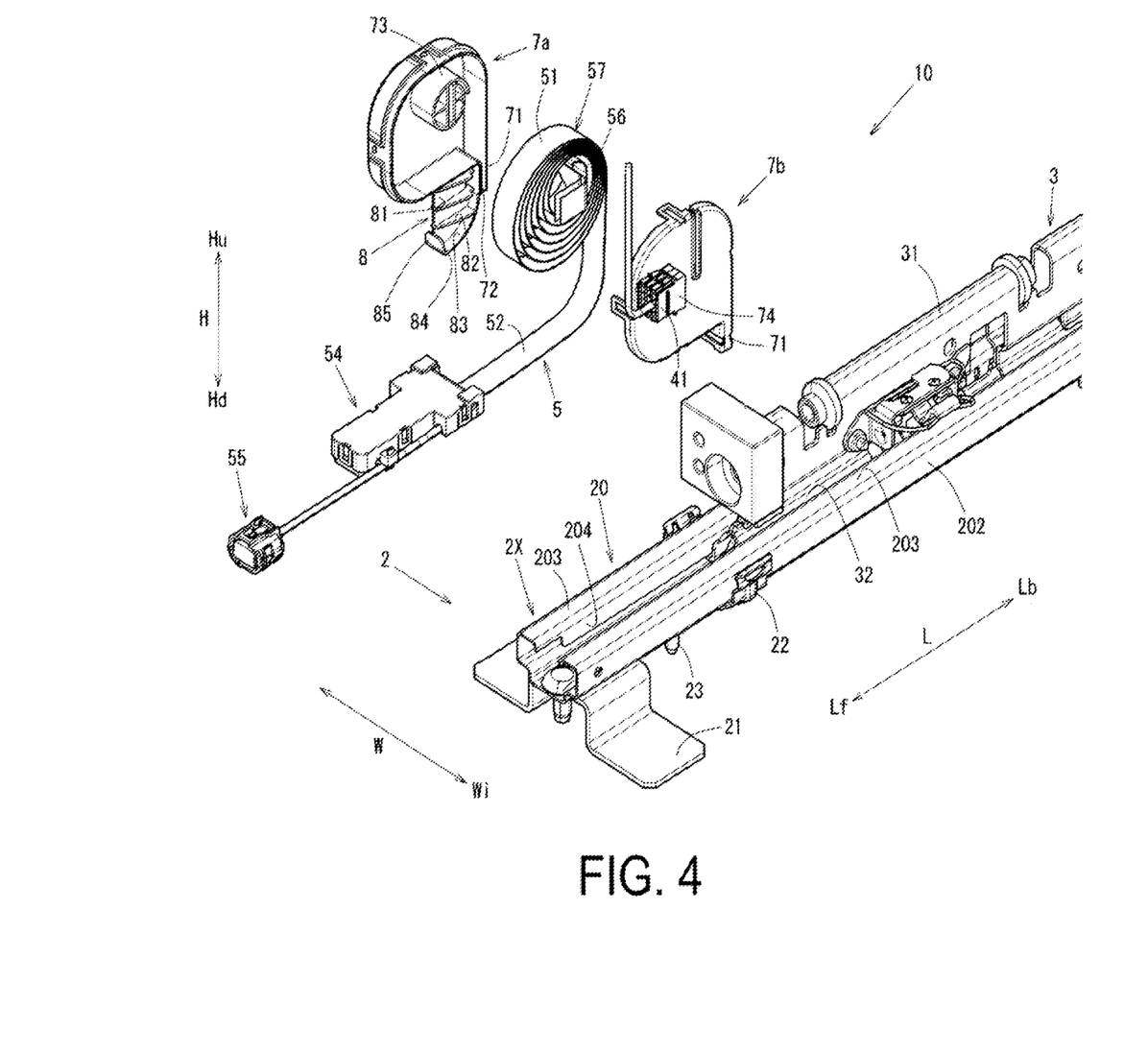
FIG. 4 is an exploded perspective view of a cable winding device.
Figure 5:
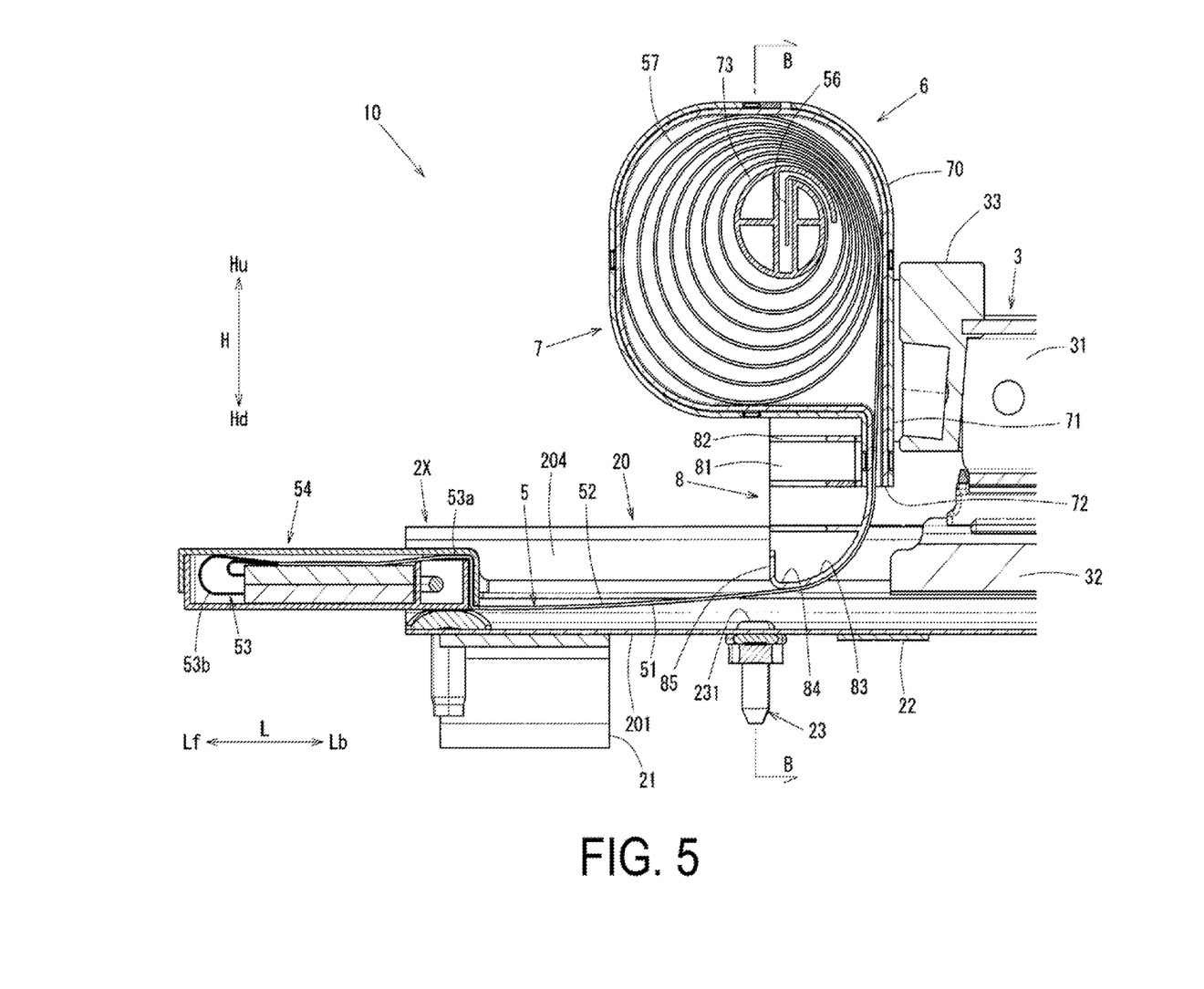
FIG. 5 is an enlarged cross-sectional view along line A-A of FIG. 2.
Figure 6:
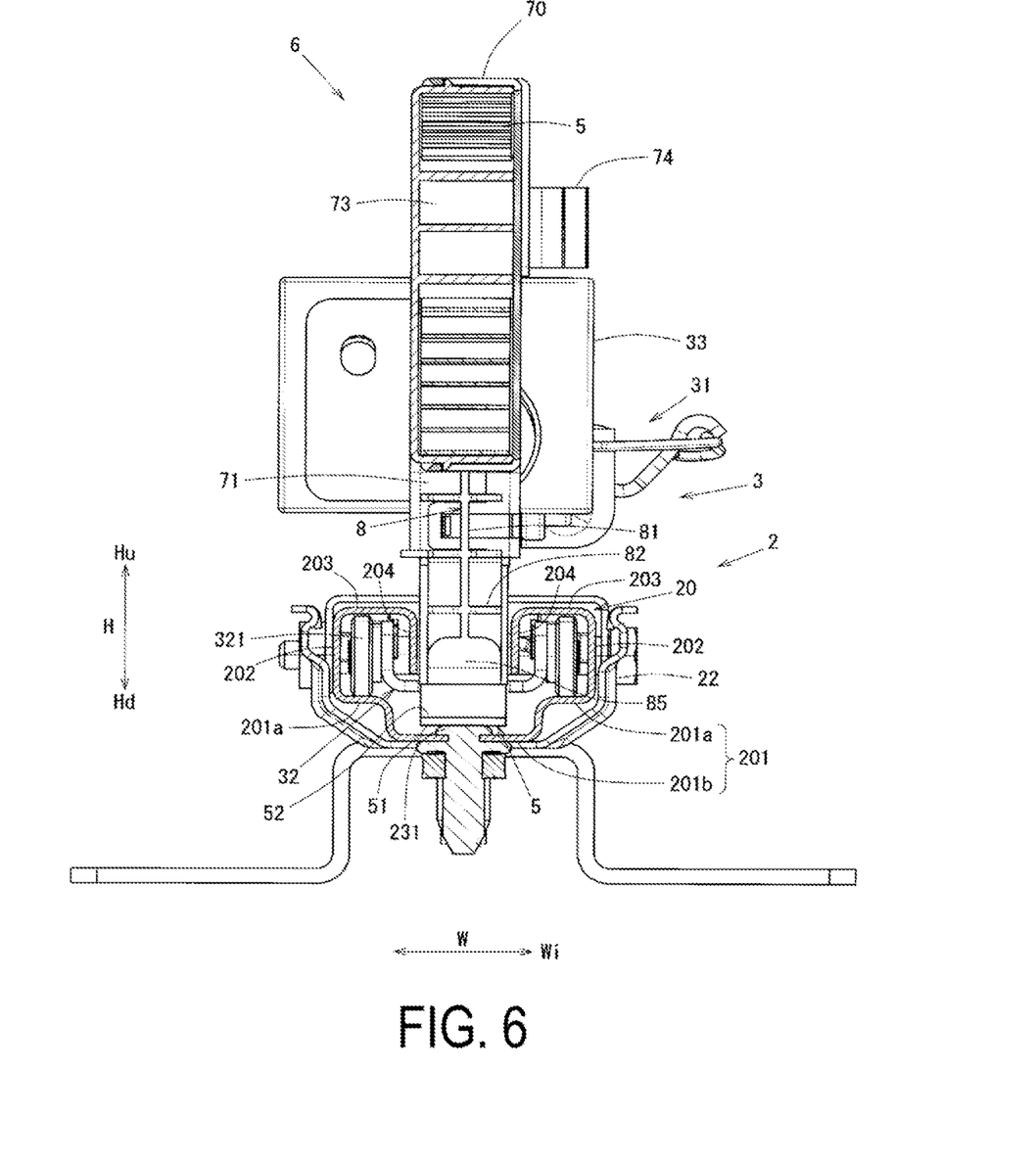
FIG. 6 is an enlarged cross-sectional view along line B-B of FIG. 5.

FIG. 1 is a schematic perspective view of a seat sliding structure 1. FIG. 2 is a schematic perspective view of a flat cable routing structure 10. FIG. 3 is an enlarged cross-sectional perspective view along line A-A of portion a of FIG. 2. FIG. 4 is an exploded perspective view of a cable winding device 6. FIG. 5 is an enlarged cross-sectional view along line A-A of FIG. 2. FIG. 6 is an enlarged cross-sectional view along line B-B of FIG. 5.

Note that, to illustrate the structure of the flat cable routing structure 10 in detail in FIG. 1, a sliding seat 4 is illustrated in a transparent state. Furthermore, in FIGS. 3 to 6, a flexible flat cable 51 (referred to as FFC 51 below) and a thin strip member 52 that constitute a cable routing body 5 have thickness, but for clarity of the routing arrangement, the flexible flat cable 51 and the thin strip member 52 are illustrated as a cross-sectional line with no thickness and stacked on one another with spacing therebetween.

Note that the longitudinal direction of a fixed rail 2, that is, the advance and withdraw direction of a slider 3 is referred to as a forward and backward direction L. In the present embodiment, the front side (left front side in FIG. 1) of the forward and backward direction L is referred to as a forward movement direction Lf, and the back side (right back side in FIG. 1) is referred to as a backward movement direction Lb. Additionally, a direction orthogonal to the forward and backward direction L in the horizontal plane is referred to as a width direction W. Additionally, a direction in which two fixed rails 2 disposed at a predetermined interval in the width direction W face each other is referred to as an opposing direction inner side Wi. Furthermore, the vertical direction in FIG. 1 is referred to as a height direction H, upward in the height direction H is referred to as an upward direction Hu and downward is referred to as a downward Hd.

As illustrated in FIG. 1, the seat sliding structure 1 configured to slide the sliding seat 4 in the forward and backward direction L in a vehicle cabin of the vehicle includes two fixed rails 2 fixed to a vehicle cabin floor at a predetermined interval in the width direction W, the two fixed rails being long in the forward and backward direction L; the slider 3 that is mounted on each fixed rail 2 in a manner allowing for sliding movement in the forward and backward direction L; and a sliding seat 4 slidably supported by the sliders 3 on both sides in the width direction W.

As illustrated in FIG. 6, the fixed rail 2 that constitutes the seat sliding structure 1 in this manner, includes a rail body 20 with a groove-like cross-section; a fixing bracket 21 that fixes the rail body 20 to the vehicle cabin floor; a shape retaining member 22 that retains the cross-sectional shape of the rail body 20; and a bottom surface bolt 23 that is attached to a rail bottom surface portion 201 of the rail body 20.

The rail body 20, as seen in a cross-section, is formed with a groove-like cross-section formed with the rail bottom surface portion 201 with an upside-down hat-shaped cross-section, a side wall portion 202 provided on each side of the rail bottom surface portion 201 in the width direction W; upper surface portions 203 that extend in a direction to oppose one another from the upper ends of the side wall portions 202; and inner wall portions 204 that extend in the downward Hd from the inner end portions of the opposing upper surface portions 203.

Note that the inner wall portions 204 are provided at a predetermined interval in the width direction W, and the interval in the width direction W between the inner wall portions 204 is formed marginally greater than the width of the cable routing body 5 described below. Also, although not illustrated, a rail mold is provided across the upper surface portions 203 on both sides in the width direction W to prevent foreign material from entering the inside of the rail body 20 with a groove-like cross-section. Note that the rail mold is a deformable sheet member, and a slit in the forward and backward direction L is provided in the center of the sheet member in the width direction W.

Furthermore, portions of the upside-down hat-shaped rail bottom surface portion 201 on both sides in the width direction W are defined as upper bottom surface portions 201a, and a portion centrally located in the width direction W at a position lower than the upper bottom surface portion 201a is defined as a center bottom surface portion 201b. Note that the center bottom surface portion 201b is formed with width that is wider than the interval between the inner wall portions 204 disposed at a predetermined interval in the width direction W above it.

The fixing bracket 21 that fixes the rail body 20 to the vehicle cabin floor has a hat-shaped cross-section. The fixing bracket 21 supports the rail bottom surface portion 201 of the rail body 20 at a portion centrally located in the width direction W projecting in the upward direction Hu and is fixed on both sides in the width direction W to the vehicle cabin floor. Note that a plurality of fixing brackets 21 are disposed at a predetermined interval in the forward and backward direction L.

The shape retaining member 22 that retains the cross-sectional shape of the rail body 20 has a recessed cross-sectional shape that corresponds to the rail bottom surface portion 201 and the side wall portions 202 on both sides in the width direction W of the rail body 20 and is wide in the width direction W and is open in the upward direction Hu. A plurality of shape retaining members 22 are mounted on the rail body 20 at predetermined intervals.

The bottom surface bolt 23 is mounted in the center bottom surface portion 201b of the rail bottom surface portion 201 so that a bolt head portion 231 is disposed in the center bottom surface portion 201b of the rail bottom surface portion 201 of the rail body 20 with a groove-like cross-section. Note that a plurality of bottom surface bolts 23 are disposed at predetermined intervals in the forward and backward direction L. In this way, in the upper surface of the center bottom surface portion 201b, the bolt head portion 231 is disposed projecting in the upward direction Hu at predetermined intervals in the forward and backward direction L.

The slider 3 is mounted on the fixed rail 2 with this configuration in a manner allowing for the slider 3 to slide in the forward and backward direction L. The slider 3 projects in the upward direction Hu further than the upper surface portion 203 of the rail body 20 of the fixed rail 2 and includes an upper support portion 31 that supports the sliding seat 4 and an inner running portion 32 disposed inside the rail body 20.

The inner running portion 32 is disposed inside the rail body 20 and includes a roller 321 provided on each side in the width direction W that rolls in the forward and backward direction L restricted in the height direction H by the upper surface portion 203 and the upper bottom surface portion 201*a*.

In the seat sliding structure 1 with such a configuration, inside the rail body 20 of the fixed rail 2 disposed along the forward and backward direction L, when the rollers 321 roll in the forward and backward direction L, the slider 3 slides in the forward and backward direction L with respect to the fixed rail 2. Thus, the sliding seat 4 can slide in the forward and backward direction L with respect to the fixed rail 2.

In the seat sliding structure 1, the flat cable routing structure 10 for supplying power to the sliding seat 4 capable of sliding in the forward and backward direction L with respect to the fixed rail 2 includes the cable routing body 5 run in the forward and backward direction L along the fixed rail 2 for one of the fixed rails 2 and sliders 3 (in the present embodiment, the ones located on the left side when viewed from the forward movement direction Lf) disposed at a predetermined interval in the width direction W of the seat sliding structure 1; and the cable winding device 6 that houses the cable routing body 5 in a manner allowing it to be wound up and fed out.

The cable routing body 5 includes the FFC 51, which is a strip-shaped conductor with a thin plate shape formed from a plurality of rectangular conductors sandwiched between insulating laminate sheets and the thin strip member 52 layered together with the FFC 51 in the upward direction Hu, the thin strip member 52 being harder than the FFC 51.

The thin strip member 52 is a stainless steel spring steel resistant to rusting. The thin strip member 52, as the cable routing body 5 together with the FFC 51, is housed in the cable winding device 6 in a manner allowing it to be wound up and fed out, and thus has a thickness of 0.2 mm or less.

In addition, the thin strip member 52 is layered on top of the FFC 51 in a state in which the cable routing body 5 is laid inside the rail body 20 formed with a groove-like cross-section. In addition, the cable routing body 5 formed of the FFC 51 and the thin strip member 52 are formed with lengths longer than the length of the fixed rail 2 in the forward and backward direction L.

A front end portion 53 of the cable routing body 5 including the layered FFC 51 and the thin strip member 52 is fixed to an engagement fixing portion 54 that engages with a rail front end portion 2X, which is the end portion of the fixed rail 2 in the forward movement direction Lf. A vehicle body side connector 55 that engages and connects with/to a power supply connector on the vehicle body side extends from the engagement fixing portion 54, and inside the engagement fixing portion 54, the FFC 51 constituting the cable routing body 5 and the vehicle body side connector 55 are electrically connected.

Note that as illustrated in FIG. 5, the front end portion 53 of the cable routing body 5, inside the engagement fixing portion 54, includes a step structure portion 53*a* located on the backward movement direction Lb side that is bent in the upward direction Hu and in the forward movement direction Lf and a bent back structure portion 53*b* located to the forward movement direction Lf of the engagement fixing portion 54 that is bent back in the backward movement direction Lb. The front end portion 53 of the cable routing body 5 is fixed to the engagement fixing portion 54. In this manner, the cable routing body 5 with the front end portion 53 fixed to the engagement fixing portion 54 that engages with the rail front end portion 2X is fixed to the rail front end portion 2X via the engagement fixing portion 54.

The cable winding device 6 that houses the cable routing body 5 in a manner allowing it to be wound up and fed out is constituted by a winding housing portion 7 and a guide portion 8.

The winding housing portion 7 includes a housing 70 with a substantially square shape with rounded corners when viewed from the width direction W and a downward extending portion 71 extending downward from the backward movement direction Lb side of the housing 70, and a lower end of the downward extending portion 71 is a cable entrance 72.

Note that the downward extending portion 71 and the cable entrance 72 through which the cable routing body 5 passes is formed with a width wider than the width of the cable routing body 5 and the interval between the inner wall portions 204 of the rail body 20.

Furthermore, a winding shaft 73 is provided inside the winding housing portion 7 that fixes a winding end portion 56 of the cable routing body 5. The winding shaft 73 is a shaft around which the winding end portion 56 can be wound via a spiral spring omitted from the drawings. Note that the cable routing body 5 wound around the winding shaft 73 inside the winding housing portion 7 in this manner is referred to as a wound cable 57.

Furthermore, in the present embodiment, in FIG. 5, the winding shaft 73 is rotated counterclockwise to wind the cable routing body 5, and the winding shaft 73 is rotated clockwise to unwind the wound cable 57 and feed out the cable routing body 5 from the winding housing portion 7.

Further, the winding shaft 73 is disposed within the winding housing portion 7, which has a substantially square shape with rounded corners when viewed from the width direction W, at a position eccentric in the backward movement direction Lb and the upward direction Hu to the center of the substantially square shape described above.

In addition, a seat side connector 74 is fixed to the housing 70 constituting the winding housing portion 7 on the opposing direction inner side Wi. The seat side connector 74 is engaged with and electrically connected to a device side connector 41 connected to the end portion of the FFC 51 of the cable routing body 5, a seat side connector 74 is electrically connected to an internally disposed end portion of the FFC 51 of the cable routing body 5 fixed at one end portion to the winding shaft 73 and engages with and is electrically connected to a device side connector 41 connected to an electronic device mounted in/on the sliding seat 4.

The guide portion 8 is formed, at the backward movement direction Lb side of the winding housing portion 7, with a half-shell shape that faces downward as viewed from the width direction W and extends in the downward Hd from the cable entrance 72 along the forward movement direction Lf of the downward extending portion 71.

More specifically, the guide portion 8 includes, at the backward movement direction Lb side of the winding housing portion 7, a guide body 81 that is a half-shell shaped plate-like member facing downward as viewed from the width direction W and extends further in the downward Hd than the cable entrance 72 in the forward movement direction Lf of the downward extending portion 71; tapered portions 82 disposed on the guide body 81 and spaced from one another at predetermined intervals in the height direction H; an arc-shaped guide portion 83 with an arc shape from the cable entrance 72 running in the downward Hd toward the forward movement direction Lf; an upper restricting portion 84 configure by the lower and front end portion of the arc-shaped guide portion 83; and a front bent back portion 85 where the end portion of the upper restricting portion 84 in the forward movement direction Lf is bent back smoothly in the upward direction Hu.

Note that the tapered portion 82, the arc-shaped guide portion 83, the upper restricting portion 84, and the front bent back portion 85 are configured in a flange shape extending from the plate-like guide body 81 extending in the height direction H to both sides in the width direction W.

Note that the tapered portion 82, the arc-shaped guide portion 83, the upper restricting portion 84, and the front bent back portion 85 configured in a flange shape extending from the plate-like guide body 81 to both sides in the width direction W have the same width. The width is marginally narrower than the interval in the width direction W between the inner wall portions 204 of the rail body 20 described above and substantially the same as that of the cable routing body 5. In other words, they have a width that is narrower than the downward extending portion 71 and the cable entrance 72 formed with a width wider than the interval in the width direction W between the inner wall portions 204 of the rail body 20 described above.

As described above, the tapered portion 82 is disposed in a substantially horizontal manner on both sides in the width direction W of the guide body 81 extending in the height direction H and tapers with an inclination toward the forward movement direction Lf. Note that three tapered portions 82 are disposed at a predetermined interval in the height direction H. The top tapered portion 82 is disposed at a position higher in the upward direction Hu than the cable entrance 72, the middle tapered portion 82 is disposed at a position at a height corresponding to the cable entrance 72, and the bottom tapered portion 82 is disposed at a height corresponding to the upper surface portion 203 of the rail body 20, that is, a height corresponding to the rail mold (not illustrated) when mounted on the fixed rail 2.

The arc-shaped guide portion 83 with an arc shape, which is running from the front end of the cable entrance 72 in the downward Hd toward the forward movement direction Lf, is formed in an arc shape as viewed from the width direction W such that the cable routing body 5 installed inside the rail body 20 formed with a groove-like cross-section is guided toward the cable entrance 72 when wound. Specifically, the arc-shaped guide portion 83 is formed in a ¼ elliptical arc shape projecting in the backward movement direction Lb and the downward Hd and runs from a position corresponding to the cable entrance 72 toward the front lower end of the guide body 81.

The lower and front end portion of the arc-shaped guide portion 83 configured as described above is referred to as the upper restricting portion 84 that restricts on the upper side the cable routing body 5 installed inside the rail body 20 with a groove-like cross-section. Note that, the upper restricting portion 84 may not be configured as the lower and front end portion of the arc-shaped guide portion 83, and in another configuration, the upper restricting portion 84 may be a flat section extending from the lower and front end portion of the arc-shaped guide portion 83 in the forward movement direction Lf.

The front bent back portion 85 where the end portion of the upper restricting portion 84 in the forward movement direction Lf is smoothly bent back in the upward direction Hu is formed bent back with the corner portion in the forward movement direction Lf and the downward Hd formed into an arc shape. The upper end of the front bent back portion 85 is formed at a height above the lower end of the inner wall portions 204 of the rail body 20 when mounted on the fixed rail 2.

In this manner, the upper restricting portion 84 does not come into contact with the FFC 51 in the case in which the cable winding device 6 slides normally or sliding of the cable winding device 6 is stopped, i.e., in normal use states. Also, the upper restricting portion 84 restricts the upward movement of the FFC 51 in the case in which the FFC 51 is unintentionally moved upward inside the rail body 20 and guides the winding of the FFC 51 into the winding housing portion 7.

The cable winding device 6 configured in this manner includes a first part 7a and a second part 7b. The first part 7a includes substantially half in the width direction W of the housing 70, the downward extending portion 71, and the cable entrance 72; the winding shaft 73, and the guide portion 8 integrally formed. The second part 7b includes substantially half on the other side in the width direction W of the housing 70, the downward extending portion 71, and the cable entrance 72 integrally formed, the seat side connector 74 being fixed to the second part 7b. The first part 7a and the second part 7b are assembled together, sandwiching the cable routing body 5 from both sides in the width direction W.

Also, as illustrated in FIG. 2, the cable winding device 6 configured in this manner can be fixed on the forward movement direction Lf side of the slider 3 via an attachment 33 connected to the back end of the cable winding device 6 and mounted on the fixed rail 2 as the flat cable routing structure 10.

Note that in the cable winding device 6 mounted on the fixed rail 2 via the slider 3, the cable entrance 72 is positioned further in the upward direction Hu than the upper surface portions 203 of the rail body 20, and the lower portion of the guide portion 8 is inserted into a groove inner portion of the rail body 20.

Specifically, as described above, the tapered portion 82 positioned lowest in the downward Hd of the three tapered portions 82 provided in the guide portion 8 is disposed at a height corresponding to the upper surface portions 203 of the rail body 20, the upper restricting portion 84 is disposed above and spaced a predetermined interval from the cable routing body 5 installed inside the groove inner portion of the rail body 20 and disposed further in the downward Hd than the lower end of the inner wall portions 204, and the upper end of the front bent back portion 85 is disposed at a position further in the upward direction Hu than the lower end of the inner wall portions 204.

In the flat cable routing structure 10 with the cable winding device 6 disposed in relation to the fixed rail 2 in this manner, when the slider 3 moves in the backward movement direction Lb, the wound cable 57 wound in the winding housing portion 7 of the cable winding device 6 is unwound, fed out through the downward extending portion 71 from the cable entrance 72, and the cable routing body 5 with the front end portion 53 fixed at the forward movement direction Lf side is installed inside the rail body 20.

Here, the cable routing body 5 is disposed above the bolt head portions 231 disposed at predetermined intervals in the forward and backward direction L in the rail bottom surface portion 201 of the rail body 20. Note that the cable routing body 5 installed in the groove inner portion of the rail body 20 is installed with the thin strip member 52 layered on the upward direction Hu side of the FFC 51.

Conversely, when the slider 3 moves from the backward movement direction Lb to the forward movement direction Lf, the cable routing body 5 installed inside the groove inner portion of the rail body 20 is guided into the cable entrance 72 by the arc-shaped guide portion 83 of the guide portion 8 of the cable winding device 6 that moves in the forward movement direction Lf together with the slider 3, allowing the cable routing body 5 to be wound and housed in the winding housing portion 7.

In this way, the flat cable routing structure 10 includes the cable winding device 6 for routing the FFC 51 to the sliding seat 4 slidably supported allowing for forward and backward movement in the forward and backward direction L of the fixed rail 2 fixed to the vehicle cabin floor; the fixed rail 2 fixed to the vehicle cabin floor; the slider 3 that slidably supports the sliding seat 4 allowing for forward and backward movement in the forward and backward direction L of the fixed rail 2, the cable winding device 6 being fixed to the slider 3; and the FFC 51 wound in the cable winding device 6 in a manner allowing it to be fed out, the FFC 51 including the front end portion 53 fixed to the rail front end portion 2X and the winding end portion 56 fixed to the cable winding device 6. This flat cable routing structure 10 routes the FFC 51 to the sliding seat 4 slidably supported allowing for forward and backward movement in the forward and backward direction L of the fixed rail 2. The flat cable routing structure 10 configured in this manner has a compact structure and can supply power to the sliding seat 4 via the FFC 51.

Specifically, the cable winding device 6, in which the front end portion 53 of the FFC 51 is fixed to the rail front end portion 2X of the fixed rail 2, is provided with the winding housing portion 7 inside which the winding end portion 56 of the FFC 51 is fixed and inside which the FFC 51 is wound and housed in a manner being able to be fed out. The cable winding device 6 is fixed to the slider 3 that supports the sliding seat 4 and slides in the forward and backward direction L with respect to the fixed rail 2, and when the cable winding device 6 moves in the forward movement direction Lf toward the rail front end portion 2X, the FFC 51 routed along the fixed rail 2 is wound in the winding housing portion 7. In this way, for example, by removing the need for large space for a harness housing portion that movably houses a U-turn portion, such as in known power supply devices, a compact structure can be achieved.

In addition, when the cable winding device 6 moves in the backward movement direction Lb away from the rail front end portion 2X, the FFC 51 is fed out along the fixed rail 2 from the winding housing portion 7. Thus, compared to a known power supply device in which a U-turn portion moves when the sliding seat 4 slides, the FFC 51 does not slide together with the fixed rail 2 and the like. This can enhance the durability of the FFC 51.

In addition, because the cable winding device 6 provided with the winding housing portion 7 is disposed on the forward movement direction Lf of the slider 3, when the FFC 51 is wound in the winding housing portion 7 or fed out from the winding housing portion 7, the FFC 51 follows the sliding of the sliding seat 4 smoothly, without a large bending load acting on the FFC 51 as is what happens in the case in which the cable winding device 6 is disposed on the backward movement direction Lb of the slider 3.

In addition, because the cable entrance 72 through which the FFC 51 passes in and out of the winding housing portion 7 of the cable winding device 6 is provided closer to the fixed rail 2 than the winding housing portion 7, when the FFC 51 is wound in the winding housing portion 7 or fed out from the winding housing portion 7, the FFC 51 follows the sliding of the sliding seat 4 smoothly, without a bending load acting on the FFC 51 as is what happens in the case in which the winding housing portion 7 is disposed closer to the fixed rail 2 than the cable entrance 72. Also, the cable entrance 72 can be prevented from being visible to the occupant.

Furthermore, because the winding shaft 73 around which the FFC 51 is wound is provided in the winding housing portion 7 and the cable entrance 72 is disposed in the backward movement direction Lb of the winding shaft 73, the route through the cable entrance 72 and inside the winding housing portion 7 of the FFC 51 housed by being wound is made simple and not complex. Also, the load acting on the FFC 51 when the FFC 51 wound around the winding shaft 73 is wound or fed out can be reduced.

In addition, in the case in which the cable entrance 72 is disposed in the forward movement direction Lf of the winding shaft 73, the cable entrance 72 is located at a position away from the slider 3. In this case, the position of the cable entrance 72 relative to the slider 3 may change due to vibrations when the slider 3 moves along the fixed rail 2. In contrast, because the cable entrance 72 disposed in the backward movement direction Lb of the winding shaft 73 is disposed close to the slider 3, it is unlikely that the position will change when the slider 3 moves, and the FFC 51 can be wound and fed out smoothly.

In addition, because the winding shaft 73 is disposed eccentric in the backward movement direction Lb and the upward direction Hu inside the winding housing portion 7, the load that acts on the FFC 51 inside in the winding housing portion 7 can be reduced.

Specifically, by the winding shaft 73 being disposed eccentric in the backward movement direction Lb and the upward direction Hu, space is formed in the forward movement direction Lf and the downward Hd inside the winding housing portion 7, and, as illustrated in FIG. 5, the FFC 51 wound around the winding shaft 73 can spread out into this space in the forward movement direction Lf and the downward Hd when being fed out and unwound. This can reduce the load that acts on the FFC 51 inside the winding housing portion 7.

Furthermore, the cable entrance 72 is disposed in the upward direction Hu of the fixed rail 2 including the rail bottom surface portion 201 and the side wall portion 202 erected on each side of the rail bottom surface portion 201 in the width direction W such that a groove-like cross-section is formed with the rail bottom surface portion 201 and the side wall portion 202, and the guide portion 8 is provided extending from the cable entrance 72 to the groove inner portion of the fixed rail 2. Thus, the FFC 51 can be smoothly wound and fed out with respect to the groove inner portion of the fixed rail 2 with a groove-like cross-section via the guide portion 8.

In addition, because the cable entrance 72 is disposed in the upward direction Hu of the fixed rail 2, a wide cable entrance 72 relative to the width of the FFC 51 can be formed. This can prevent the FFC 51 that passes through the cable entrance 72 from sliding on the cable entrance 72.

Also, the guide portion 8 is disposed on the opposite side, with respect to the FFC 51, to the rail bottom surface portion 201, and includes the upper restricting portion 84 that restricts in the upward direction Hu the FFC 51 installed in the groove inner portion of the fixed rail 2 and the arc-shaped guide portion 83 with an arc shape that guides the FFC 51 toward the cable entrance 72. In this way, the FFC 51 can be guided to the cable entrance 72 by the arc-shaped guide portion 83, and the FFC 51 can be smoothly wound and fed out with respect to the groove inner portion of the fixed rail 2 with a groove-like cross-section.

In addition, the position, in the groove inner portion of the fixed rail 2, of the FFC 51 that is wound and fed out is restricted in the upward direction Hu by the upper restricting portion 84, preventing any obstruction to smooth winding and feeding out.

Specifically, though in the normal use state, the upper restricting portion 84 is a non-contact region that does not come into contact with the FFC 51, the upper restricting portion 84 restricts on the upper side the FFC 51 that moves unintentionally upward, allowing the FFC 51 to be wound and guided into the winding housing portion 7.

In addition, because the front bent back portion 85, that is smoothly bent back in the upward direction Hu, is provided on the end portion of the upper restricting portion 84 in the forward movement direction Lf, the FFC 51 when being wound or fed out can be smoothly wound or fed out without catching on the end portion of the upper restricting portion 84 in the forward movement direction Lf.

In addition, because the tapered portion 82, that tapers with an incline toward the forward movement direction Lf, is provided on the upper portion of the guide portion 8 at least above the upper restricting portion 84, the guide portion 8 extending to the groove inner portion of the fixed rail 2 with a groove-like cross-section can move smoothly without any obstruction to the movement in the forward movement direction Lf of the slider 3.

In particular, even in the case in which the rail mold is provided that prevents foreign material from entering the upper portion of the fixed rail 2 with a groove-like cross-section, the tapered portion 82, that tapers with an incline toward the forward movement direction Lf, can push through the rail mold when moving in the forward movement direction Lf, allowing for smooth movement.

Additionally, the fixed rail 2 includes the rail bottom surface portion 201 and the side wall portion 202 erected on each side of the rail bottom surface portion 201 in the width direction W such that a groove-like cross-section is formed with the fail bottom portion 201 and the side wall portion 202, and the bolt head portions 231 that protrude in the upward direction Hu are provided at predetermined intervals in the forward and backward direction L on the rail bottom surface portion 201. In this way, in the groove inner portion of the fixed rail 2, the FFC 51 is disposed above the bolt head portions 231 disposed at predetermined intervals in the forward and backward direction L. This can reduce the number of contacting locations with the FFC 51 routed in the groove inner portion and prevent the FFC 51 and the rail bottom surface portions 201 from rubbing together.

Additionally, in the groove inner portion of the fixed rail 2, the thin strip member 52 with a hardness greater than the FFC 51 is installed along the forward and backward direction L and layered on the FFC 51 in the upward direction Hu. Thus, the FFC 51 routed in the groove inner portion can be protected by the hard thin strip member 52.

Additionally, because the FFC 51 is wound in the winding housing portion 7 together with the thin strip member 52 as the cable routing body 5, the FFC 51 and the thin strip member 52 are layered together, wound and fed out together, and routed together along the fixed rail 2.

In addition, because the front end portion 53 of the FFC 51 is formed with the step structure portion 53a or the bent back structure portion 53b and fixed to the rail front end portion 2X, though, when the FFC 51 and the thin strip member 52 layered together are wound in the winding housing portion 7, slack may be created due to the FFC 51 and the thin strip member 52 having different winding diameters and thus a different circumferential length, this difference in circumferential length can be absorbed at the front end portion 53 formed with the step structure portion 53a and the bent back structure portion 53b.

In addition, because the seat side connector 74 electrically connected to the FFC 51 housed inside the cable winding device 6 is provided in the cable winding device 6, the FFC 51 can easily and reliably be electrically connected to an electronic device provided in the sliding seat 4 that slides via the seat side connector 74.

In addition, because the seat side connector 74 is fixed to an external portion external to the housing 70 of the cable winding device 6, the seat side connector 74 can be stabilized and an electronic device provided in the sliding seat 4 that slides can be more reliably electrically connected via the seat side connector 74.

In addition, because two of the fixed rails 2 are disposed with a predetermined interval therebetween in the width direction W, the cable winding device 6 is mounted on the slider 3 mounted on one of the two fixed rails 2, and the seat side connector 74 is fixed to the opposing direction inner side Wi of the housing 70 of the cable winding device, the seat side connector 74 is not visible to the occupant. Thus, good appearance can be maintained, and an electronic device provided in the sliding seat 4 that slides can be easily and reliably electrically connected via the seat side connector 74.

The elements of the configuration of the disclosure and the elements in the embodiment described above correspond as follows:

a vehicle body of the disclosure corresponds to the vehicle cabin floor;
a fixed rail corresponds to the fixed rail 2;
a longitudinal direction corresponds to the forward and backward direction L;
a sliding seat corresponds to the sliding seat 4;
a flexible flat cable corresponds to the FFC 51;
a cable winding device corresponds to the cable winding device 6;
a first cable end portion corresponds to the front end portion 53;
a first rail end portion corresponds to the rail front end portion 2X;
a second cable end portion corresponds to the winding end portion 56;
a winding housing portion corresponds to the winding housing portion 7;
a movable body corresponds to the slider 3;
a forward movement direction corresponds to the forward movement direction Lf;
a cable entrance corresponds to the cable entrance 72;
a communicating portion corresponds to the downward extending portion 71;
a winding shaft corresponds to the winding shaft 73;
a side closer to the cable entrance in a forward and backward direction corresponds to the backward movement direction Lb;
a side away from the cable entrance in a vertical direction corresponds to the upward direction Hu;
a backward movement direction corresponds to the backward movement direction Lb;
a vertical direction corresponds to the height direction H;
a rail bottom surface portion corresponds to the rail bottom surface portion 201;
a width direction corresponds to the width direction W;
a rail side wall corresponds to the side wall portion 202;
a guide portion corresponds to the guide portion 8;
an upper restricting portion corresponds to the upper restricting portion 84;

an arc-shaped guide portion corresponds to the arc-shaped guide portion 83;

a front bent back portion corresponds to the front bent back portion 85;

a tapered portion corresponds to the tapered portion 82; upward/above corresponds to the upward direction Hu; downward/below corresponds to the downward Hd;

a bottom surface protrusion portion corresponds to the bolt head portion 231;

a thin strip member corresponds to the thin strip member 52;

a step structure corresponds to the step structure portion 53*a*;

a bent back structure corresponds to the bent back structure portion 53*b*;

a connector corresponds to the seat side connector 74;

a housing corresponds to the housing 70;

a flat cable routing structure for a sliding seat corresponds to the flat cable routing structure 10; and a side closer to where the other fixed rail is disposed corresponds to the opposing direction inner side Wi. The disclosure is not limited to only the configuration of the embodiment described above, and many embodiments are possible.

For example, in the above description, the cable routing body 5 is configured by layering together the FFC 51 and the thin strip member 52. However, the cable routing body 5 may be configured by disposing the thin strip member 52 on both sides of the FFC 51 in the height direction H, or the cable routing body 5 may only include the FFC 51. Furthermore, instead of the thin strip member 52, a dummy cable with no conductor may be layered together with the FFC 51.

Additionally, in the description described above, the front end portion 53 is fixed to the rail front end portion 2X, which is the end portion in the forward movement direction Lf of the fixed rail 2 disposed along the forward and backward direction L. However, the front end portion 53 may be fixed to the end portion in the backward movement direction Lb of the fixed rail 2. In this case, the cable winding device 6 may be mounted in the backward movement direction Lb of the slider 3.

Furthermore, the downward extending portion 71 connecting the winding housing portion 7 and the cable entrance 72 may be inclined in the forward movement direction Lf toward the downward Hd, or in other words, as it approaches the fixed rail 2. In this case, since the downward extending portion 71 connecting the winding housing portion 7 and the cable entrance 72 is inclined in the forward movement direction Lf toward the fixed rail 2, the downward extending portion 71 is disposed in the forward movement direction Lf of the guide portion 8 relative to the section of the winding housing portion 7 where the FFC 51 is wound and fed out. This makes the route of the FFC 51 passing through the cable entrance 72, the downward extending portion 71, and the winding housing portion 7 smooth, and can reduce the load acting on the FFC 51 when the FFC 51 is wound or fed out.

Note that in the description described above, the front end portion 53 of the flexible flat cable 51 is fixed to the rail front end portion 2X of the fixed rail 2. However, in the case in which the flexible flat cable 51 does not move in the longitudinal direction relative to the rail front end portion 2X of the fixed rail 2, for example, the front end portion 53 may be fixed inside a module housing outside of the fixed rail 2, and thus indirectly fixed to the rail front end portion 2X of the fixed rail 2.

REFERENCE SIGNS LIST

2 Fixed rail
2X Rail front end portion
3 Slider
4 Sliding seat
6 Cable winding device
7 Winding housing portion
8 Guide portion
10 Flat cable routing structure
51 FFC
52 Thin strip member
53 Front end portion
53*a* Step structure portion
53*b* Bent back structure portion
56 Winding end portion
70 Housing
71 Downward extending portion
72 Cable entrance
73 Winding shaft
74 Seat side connector
82 Tapered portion
83 Arc-shaped guide portion
84 Upper restricting portion
85 Front bent back portion
201 Rail bottom surface portion
202 Side wall portion
231 Bolt head portion
H Height direction
Hd Downward
Hu Upward direction
L Forward and backward direction
Lb Backward movement direction
Lf Forward movement direction
W Width direction
Wi Opposing direction inner side

The invention claimed is:

1. A cable winding device for a flexible flat cable routed to a sliding seat slidably supported allowing for forward and backward movement in a longitudinal direction of a fixed rail fixed to a vehicle body, wherein a first side end portion of the flexible flat cable corresponding to a first cable end portion is configured to be fixed to an end of the fixed rail corresponding to a first rail end portion, the cable winding device comprising:

a winding housing portion inside which a second side end portion of the flexible flat cable corresponding to a second cable end portion is configured to be fixed and inside which the flexible flat cable is configured to be wound and housed in a manner being able to be fed out, wherein the winding housing portion is configured to be fixed to a movable body supporting the sliding seat and configured to slide in a forward and backward direction relative to the fixed rail;

in a case where the winding housing portion moves in a forward movement direction toward the first rail end portion, the flexible flat cable routed along the fixed rail is wound in the winding housing portion;

in a case where the winding housing portion moves in a backward movement direction away from the first rail end portion, the flexible flat cable is fed out along the fixed rail from the winding housing portion;

a cable entrance through which the flexible flat cable passes in and out of the winding housing portion is provided closer to the fixed rail than the winding housing portion;

a winding shaft around which the flexible flat cable is wound is provided inside the winding housing portion; and the cable entrance is disposed in a backward movement direction from the winding shaft.

2. The cable winding device according to claim 1, wherein the winding housing portion is disposed in the forward movement direction of the movable body.

3. The cable winding device according to claim 1, further comprising a communicating portion connecting the winding housing portion and the cable entrance,
wherein the communicating portion is inclined in the forward movement direction toward the fixed rail.

4. The cable winding device according to claim 1, wherein the winding shaft is disposed inside the winding housing portion on a side closer to the cable entrance in the forward and backward direction.

5. A cable winding device for a flexible flat cable routed to a sliding seat slidably supported allowing for forward and backward movement in a longitudinal direction of a fixed rail fixed to a vehicle body, wherein a first side end portion of the flexible flat cable corresponding to a first cable end portion is configured to be fixed to an end of the fixed rail corresponding to a first rail end portion, the cable winding device comprising:
a winding housing portion inside which a second side end portion of the flexible flat cable corresponding to a second cable end portion is configured to be fixed and inside which the flexible flat cable is configured to be wound and housed in a manner being able to be fed out, wherein
the winding housing portion is configured to be fixed to a movable body supporting the sliding seat and configured to slide in a forward and backward direction relative to the fixed rail;
in a case where the winding housing portion moves in a forward movement direction toward the first rail end portion, the flexible flat cable routed along the fixed rail is wound in the winding housing portion;
in a case where the winding housing portion moves in a backward movement direction away from the first rail end portion, the flexible flat cable is fed out along the fixed rail from the winding housing portion;
a cable entrance through which the flexible flat cable passes in and out of the winding housing portion is provided closer to the fixed rail than the winding housing portion,
the cable entrance is configured to be disposed above the fixed rail including a rail bottom surface portion and a rail side wall erected on each side of the rail bottom surface portion in a width direction such that a cross-section presenting a groove shape is formed with the rail bottom surface portion and the rail side wall, and
a guide portion extending from the cable entrance to a groove inner portion of the fixed rail is provided.

6. The cable winding device according to claim 5, wherein the guide portion is configured to be disposed on an opposite side, with respect to the flexible flat cable, to the rail bottom surface portion, and includes an upper restricting portion configured to restrict on an upper side the flexible flat cable installed in the groove inner portion of the fixed rail and an arc-shaped guide portion with an arc shape configured to guide the flexible flat cable toward the cable entrance.

7. The cable winding device according to claim 6, wherein on an end portion of the upper restricting portion in the forward movement direction, a front bent back portion that is bent back upward is provided.

8. The cable winding device according to claim 6, wherein on an upper portion of the guide portion at least above the upper restricting portion, a tapered portion that tapers with an incline toward the forward movement direction is provided.

9. The cable winding device according to claim 5, wherein the winding housing portion is disposed in the forward movement direction of the movable body.

10. The cable winding device according to claim 5, further comprising a communicating portion connecting the winding housing portion and the cable entrance,
wherein the communicating portion is inclined in the forward movement direction toward the fixed rail.

11. A flat cable routing structure for a sliding seat, comprising:
a cable winding device for a flexible flat cable routed to the sliding seat slidably supported allowing for forward and backward movement in a longitudinal direction of a fixed rail fixed to a vehicle body, wherein a first side end portion of the flexible flat cable corresponding to a first cable end portion is configured to be fixed to an end of the fixed rail corresponding to a first rail end portion, the cable winding device comprising:
a winding housing portion inside which a second side end portion of the flexible flat cable corresponding to a second cable end portion is configured to be fixed and inside which the flexible flat cable is configured to be wound and housed in a manner being able to be fed out;
the fixed rail fixed to the vehicle body; and
a movable body supporting the sliding seat and configured to slide in a forward and backward direction relative to the fixed rail, wherein
the movable body configured to slidably support the sliding seat allowing for forward and backward movement along the longitudinal direction of the fixed rail, the cable winding device being fixed to the movable body;
in a case where the winding housing portion moves in a forward movement direction toward the first rail end portion, the flexible flat cable routed along the fixed rail is wound in the winding housing portion;
in a case where the winding housing portion moves in a backward movement direction away from the first rail end portion, the flexible flat cable is fed out along the fixed rail from the winding housing portion; and
a connector electrically connected to the flexible flat cable housed inside the cable winding device is provided to the cable winding device.

12. The flat cable routing structure for a sliding seat according to claim 11, wherein the fixed rail includes a rail bottom surface portion and a rail side wall erected on each side of the rail bottom surface portion in a width direction such that a cross-section presenting a groove shape is formed with the rail bottom surface portion and the rail side wall, and on the rail bottom surface portion, a bottom surface protrusion portion protruding upward is provided at predetermined intervals in the longitudinal direction.

13. The flat cable routing structure for a sliding seat according to claim 11, wherein in a groove inner portion of the fixed rail, a thin strip member with a hardness greater than a hardness of the flexible flat cable is installed along the longitudinal direction above the flexible flat cable.

14. The flat cable routing structure for a sliding seat according to claim 13, wherein the flexible flat cable is wound in the winding housing portion together with the thin strip member.

15. The flat cable routing structure for a sliding seat according to claim 11, wherein the first cable end portion of the flexible flat cable includes a step structure or a bent back structure and is fixed to the first rail end portion.

16. The flat cable routing structure for a sliding seat according to claim 11, wherein the connector is fixed to an external portion external to a housing of the cable winding device.

17. The flat cable routing structure for a sliding seat according to claim 16, wherein two of the fixed rails are disposed with a predetermined interval between the fixed rails in a vehicle width direction;

the cable winding device is mounted on the movable body mounted on one of the two fixed rails, and in the housing of the cable winding device, the connector is fixed on a side of the housing closer to where the other of the fixed rails is disposed.

\* \* \* \* \*